United States Patent [19]
Massey
[11] Patent Number: 5,024,476
[45] Date of Patent: Jun. 18, 1991

[54] TOOL FOR HANDLING A HEAVY ELONGATE ARTICLE

[76] Inventor: Charles E. Massey, Cherry Tree House, Wragby Road, Lincoln, England

[21] Appl. No.: 284,946
[22] Filed: Dec. 14, 1988
[51] Int. Cl.[5] B65G 7/02; B66F 15/00
[52] U.S. Cl. 294/16; 254/94
[58] Field of Search 294/15, 16, 17, 106; 254/94, 131, 131.5

[56] References Cited

U.S. PATENT DOCUMENTS 1,635,291 7/1927 Smith et al. 254/94
2,693,935 11/1954 Halbert 294/17
2,994,551 8/1961 Garnett, Jr. 294/15
4,221,416 9/1980 Piontkowski 294/17
4,433,829 2/1984 Grover et al. 294/17 X
4,637,769 1/1987 Thorndike 294/17 X

*Primary Examiner*—Margaret A. Focarino
*Assistant Examiner*—Dean J. Kramer
*Attorney, Agent, or Firm*—Horst M. Kasper

[57] ABSTRACT

A tool for assisting in manually raising a heavy elongate article off a firm surface, comprises a handle having a pair of co-acting part-cyclindrical jaw members disposed at one end for gripping the article to be raised. A fulcrum member projects from one of the jaws on which the tool can be pivoted to raise the article off the surface. During the raising process the jaws are held together by a second handle pivoted to the first in a scissors-like manner, or by a pair of pivoted locking arms.

5 Claims, 2 Drawing Sheets

FIG.4
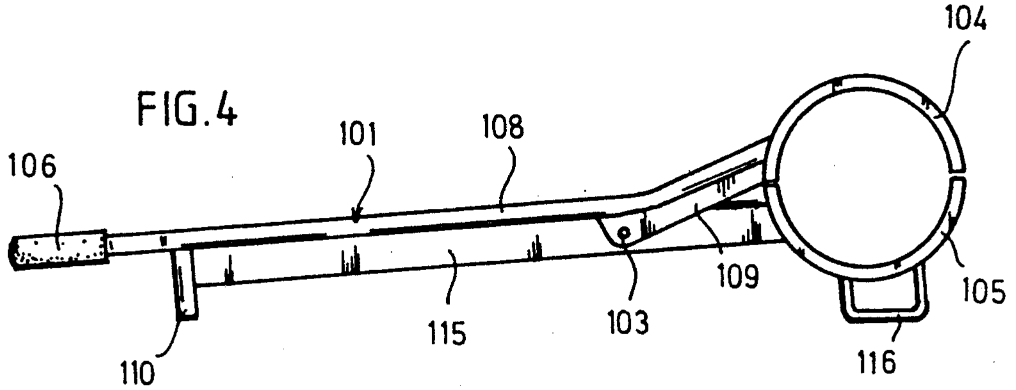
FIG.5
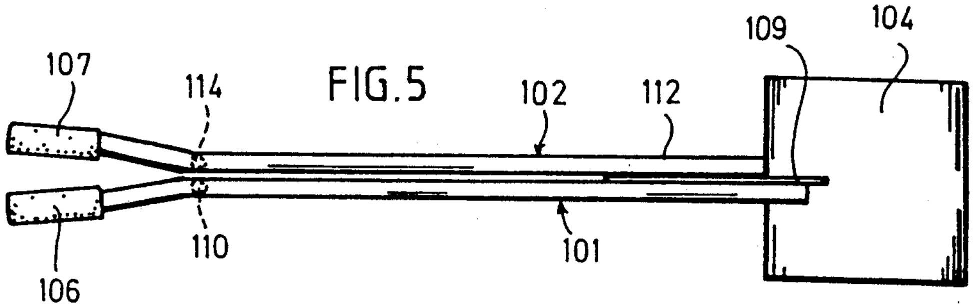
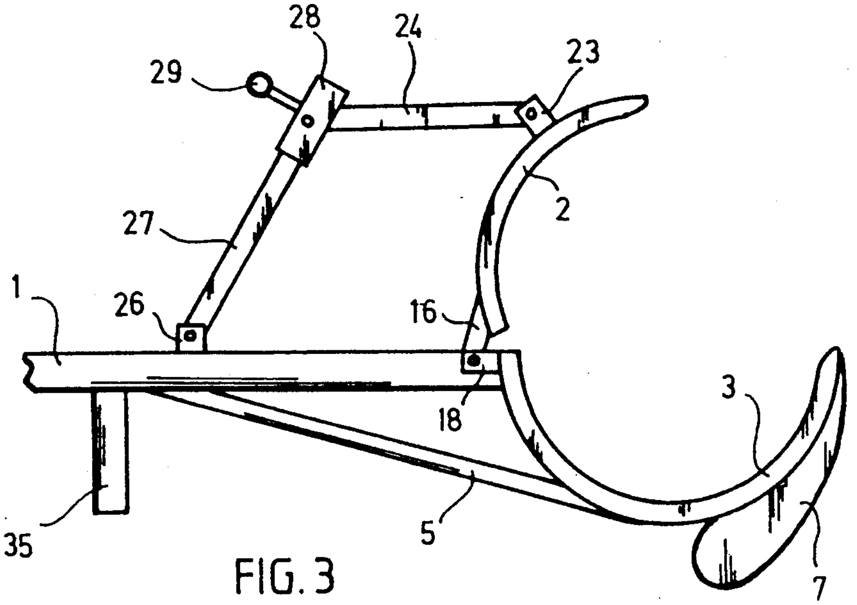
FIG.3

TOOL FOR HANDLING A HEAVY ELONGATE ARTICLE

BACKGROUND OF THE INVENTION

On oil platforms for example it is often necessary to raise a heavy metal pipe a few inches off the deck to enable a lifting sling to be passed beneath it. This is normally done using crowbars, but because the pipe tends to roll along the deck this is a very difficult task requiring at least two men.

SUMMARY OF THE INVENTION

The present invention provides a tool for assisting in manually raising a heavy elongate article off a firm surface, comprising a handle having a pair of co-acting part-cylindrical jaw members disposed at one end for gripping the article to be raised. Fulcrum means projects from one of the jaws on which the tool can be pivoted to raise the article off the surface. During the raising process the jaws are held together by a second handle pivoted to the first in a scissors-like manner, or by a pair of pivoted locking arms.

The fulcrum means is preferably arranged such that as the article is lifted the centre of gravity shifts over-centre towards the arms, enabling the tool to rest in a stable position whilst still holding the article.

THE DRAWINGS

In the drawings, which illustrate the best mode presently contemplated for carrying out the invention:

FIG. 1 is a plan view of a first embodiment of a pipe handling tool of the invention, FIG. 2 is a side view of an end portion of the tool with the jaws in a closed configuration, FIG. 3 is a similar view to FIG. 2 but showing the jaws open, FIG. 4 is a side view of a second embodiment of a pipe handling tool of the invention, FIG. 5 is a plan view of the tool of FIG. 4, and FIG. 6 is an end view of the tool of FIGS. 4 and 5.

DETAILED DESCRIPTION OF THE ILLUSTRATED EMBODIMENTS

Figure 1:
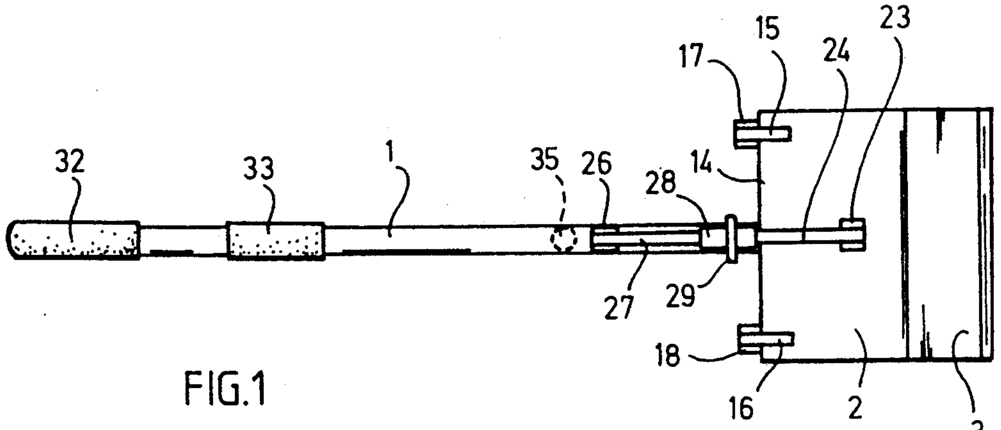
Figure 2:
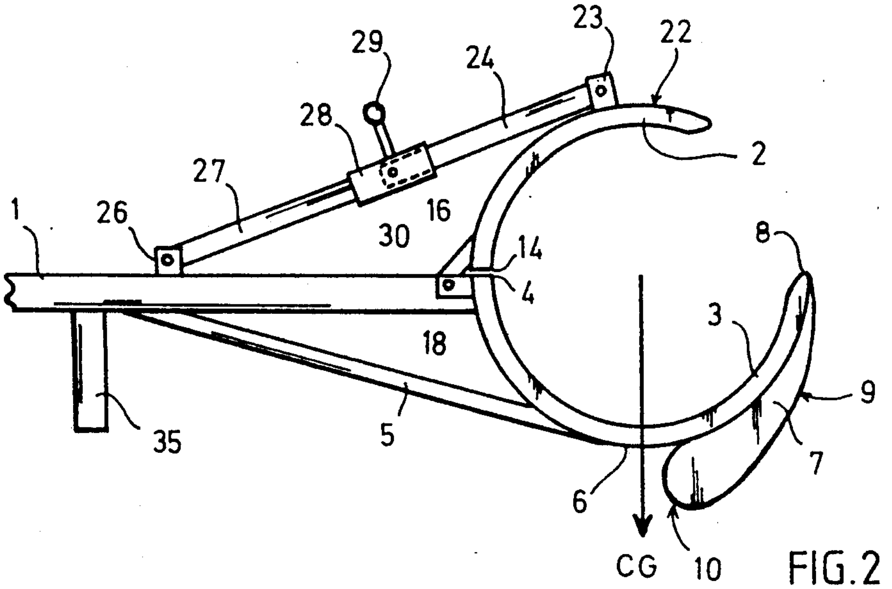

The tool illustrated in FIGS. 1 to 3 comprises a handle and first and second part-cylindrical jaws 2, 3. The second jaw 3 is hemi-cylindrical and one end of the handle 1 is rigidly welded to one axially extending edge portion 4 of this second jaw so that the handle extends radially from the jaws. A bracing rod 5 joins the outer face 6 of the second jaw 3 approximately half way between the axially extending edges of the jaw to a region part-way along the handle 1. A fulcrum member is secured to the outer face 6 of the second jaw and this member extends along the entire axial length of the jaw and is of comma-shaped section. Thus, the external surface of the fulcrum member extends from the second axially extending edge 8 of the second jaw 3 in a relatively shallow arc 9 which leads gently into a tighter arc 10 in the region where the bracing rod 5 joins the outer surface of the second jaw.

The circumferential dimension of the first jaw 2 is somewhat less than that of the second jaw 3 and one of its axially extending edges 14 carries two axially spaced hinge lugs 15, 16. These are pivotally secured between a respective pairs of hinge lugs 17, 18 secured to the first axial edge of the second jaw 3. Thus, the first jaw 2 can pivot from a closed position shown in FIG. 2 to an open position as shown in FIG. 3.

The outer face 22 of the first jaw 2 carries a pair of pivot lugs 23 about half way along its axial length, and one end of a first locking arm 24 is pivotally coupled between these lugs. A second pair of pivot lugs 26 are provided on the handle 1 diametrically opposite the region where the bracing rod 5 joins the handle. One end of a second locking arm 27 is pivotally coupled between these second pivot lugs 26, and the opposite end of this arm is rigidly secured to a channel section member 28 which extends beyond the end of the arm. The open channel of section 28 is arranged to face the handle 1 and a T-shaped handle 29 is secured to the opposite, rear surface of the channel portion. The opposite end of the first locking arm 24 to lugs 23 is received within the channel section 28and is pivotally coupled therein by a pivot pin 30 which passes through the end of the locking arm 24 and through the sides of the channel section 28.

The opposite end of the handle 1 remote from the jaws 2, 3 carries a pair of rubber hand grips 32 and 33, grip 32 being at the end of the handle and grip 33 being spaced along the handle towards the jaws. A stop 35 projects radially from the handle 1 on the same side as the bracing rod 5 and just beyond the region where the rod 5 joins the handle.

To raise a heavy elongate article such as a lamp post, girder or a steel pipe off a rigid support surface, the jaws 2, 3 are moved to an open position by pulling the T-shaped handle 29 away from the main handle 1 so that the locking arms move to a relative angular position as shown in FIG. 3. With the handle 1 upright the tool is lowered onto the article to be raised so that the article passes between the jaws with the handle 1 projecting upwardly generally perpendicular to the article. The T-shaped handle 29 is then pushed to return the locking arms to an aligned condition and close the jaws 2, 3 around the article so that it is firmly gripped between them. In this state, any attempt to prize the jaws apart simply exerts an axial thrust on the locking arms which remain in axial alignment to firmly hold the jaws closed. With one hand firmly gripping each of the hand grips 32, 33 the handle 1 is pivoted towards a horizontal position about the fulcrum member 7 which rolls on the support surface levering the article off the surface. When the stop 35 rests on the support surface the centre of gravity of the article acts vertically downwards between the stop member and the fulcrum member so that the tool rests in this stable position with the article still held firmly between the jaws. The stop 35 holds the hand grips 32, 33 off the support surface to prevent trapping of the hands.

Figure 6:
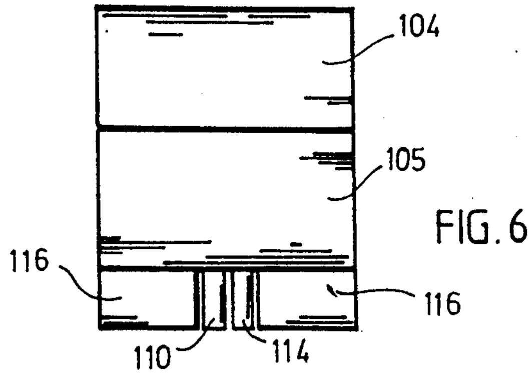

The tool of FIGS. 4 to 6 is more suitable for raising lighter elongate articles off a firm surface. The tool comprises a pair of handles 101, 102 which are pivoted together in a scissors-like manner by a pivot pin 103. At one end the handles carry a pair of co-operating hemi-cylindrical jaws 104, 105, the axis of which lies parallel to the pivot axis of pin 103, and at their opposite ends the handles carry a pair of rubber hand grips 106, 107. The pivot 103 is arranged about one fifth of the way between the jaws and the hand grips.

When viewed axially of the jaws as in FIG. 4 the first handle 101 is seen to comprise a tubular part 108 which is straight save for the portion between the pivot 103 and the first jaw 104, which portion is inclined upwardly away from the other handle 102. A pivot plate 109 is secured alongside this inclined portion of the tubular part extending below the tubular part 108, and the plate and the tubular part; are both welded to the axially extending edge of the first jaw 104. Towards the respective hand grip 106 a stop 110 projects radially from the tubular part 108 in a downward direction.

The second handle 102 also comprises a tubular part 112 which is straight when viewed as in FIG. 4, and this too carries a downwardly projecting stop 114 (FIGS. 5 and 6). A strengthening plate 115 is secured to the second jaw 105 and to the respective stop 114, projecting radially down from the tubular part 112.

The pivot pin 103 passes through the pivot plate 109 of the first handle and the strengthening plate 115 of the second handle.

The second jaw 105 has a pair of downwardly extending U-shaped fulcrum members 116 welded to its outer face spaced apart axially of the jaws either side of their axial centre.

When viewed in a direction perpendicular to the pivot axis as in FIG. 5 the handles are straight save for the portions between the stops 110, 114 and the hand grips 106, 107 which are cranked apart.

To raise a heavy elongate article off a firm surface using this tool the handles 101, 102 are pivoted apart holding one hand grip 106, 107 in each hand, and the opened jaws 104, 105 are placed around the article. The grips 106, 107 are then brought together with the handles in an upright position so that the jaws close around the pipe. With the hand grips held together to keep the jaws closed the tool is then pivoted on the fulcrum members 116 so that the handles move towards a horizontal position. In so doing, the elongate article is raised off the support surface, still held firmly between the jaws. When the handles reach a certain angle to the horizontal the centre of gravity shifts over the point of contact between the fulcrum members 116 and the hard surface towards the handles, and the article can then be lowered to a stable position resting on both stops and the fulcrum members.

I claim:

1. A tool for lifting a heavy metal pipe, comprising:
a handle having first and second ends and having a stop means projecting from said handle,
a pair of co-acting first and second jaw members disposed at a first end of said handle and defining a pair of conjoined recesses for receiving the article to be raised longitudinally of said jaws extending transverse to said handle, wherein the jaws are part-cylindrical and have longitudinal edges and where the jaws are hinged together at their longitudinal edges adjacent to the handle, and wherein the conjoined recesses of said jaws are substantially cylindrical,
hand grip means provided at said second end of said handle,
fulcrum means provided on said first jaw member and projecting transverse to both said handle and the longitudinal direction of said jaws,
and means for holding said jaws together, wherein said means for holding said jaws together comprises a second handle having first and second ends and which is pivotally coupled to the first said handle intermediate to said first and second ends of both handles, said second jaw being joined to said first end of said second handle, and said second handle having hand grip means provided at said second end thereof, the arrangement being such that said first and second jaws are opened and closed by relative pivotal movement of the respective hand grip means of said first and second handles.

2. A tool for lifting a heavy metal pipe, comprising:
a handle having first and second ends,
a pair of co-acting first and second jaw members disposed at a first ends of said handle and defining a pair of conjoined recesses for receiving the article to be raised longitudinally of said jaws extending transverse to said handle, wherein the jaws are part-cylindrical and have longitudinal edges and where the jaws are substantially cylindrical,
hand grip means provided at said second end of said handle,
fulcrum means provided on said first jaw member and projecting transverse to both said handle and the longitudinal direction of said jaws,
and means for holding said jaws together, wherein said means for holding said jaws together comprises a first locking arm pivotally coupled to said second jaw, a second locking arm pivotally coupled to said handle, and said locking arms being pivotally coupled together for movement from a locking position in which the said arms are in axial alignment to a non-locked position in which the arms are relatively angularly disposed.

3. A tool in accordance with claim 2, in which the said handle is provided with stop means projecting to the same side of said handle as said fulcrum means and located between said jaw members and said hand grip means.

4. A tool in accordance with claim 3, in which the center of said conjoined recesses is located between said stop means and said fulcrum means.

5. A tool for lifting a heavy metal pipe, comprising:
a handle having first and second ends,
a pair of co-acting first and second jaw members disposed at a first ends of said handle and defining a pair of conjoined recesses for receiving the article to be raised longitudinally of said jaws extending transverse to said handle, wherein the jaws are part-cylindrical and have longitudinal edges and where the jaws are hinged together at their longitudinal edges adjacent to the handle, and wherein the conjoined recesses of said jaws are substantially cylindrical,
hand grip means provided at said second end of said handle,
fulcrum means provided on said first jaw member and projecting transverse to both said handle and the longitudinal direction of said jaws,
and means for holding said jaws together, wherein said means for holding said jaws together comprises a first locking arm pivotally coupled to said second jaw, a second locking arm pivotally coupled to said handle, and said locking arms being pivotally coupled together for movement from a locking position in which the said arms are in axial alignment to a non-locked position in which the arms are relatively angularly disposed, and wherein said handle is provided with stop means projecting to the same side of said handle as said fulcrum means.

* * * * *